INVENTOR.
MANFRED KLARE

Feb. 28, 1961  M. KLARE  2,973,011
MEANS FOR CONNECTING A FLUID-HANDLING
DEVICE TO A PIPELINE
Filed Dec. 17, 1956  2 Sheets-Sheet 2

INVENTOR.
MANFRED KLARE
BY
*Leon M. Strauss*
AGT.

United States Patent Office 2,973,011
Patented Feb. 28, 1961

2,973,011

MEANS FOR CONNECTING A FLUID-HANDLING DEVICE TO A PIPELINE

Manfred Klare, Osnabruck, Germany, assignor to G. Kromschroder Aktiengesellschaft, Osnabruck, Germany Filed Dec. 17, 1956, Ser. No. 628,716

Claims priority, application Germany Dec. 19, 1955

2 Claims. (Cl. 137—590)

The present invention relates to means for connecting instruments or devices designed to be traversed by a flowing fluid medium, such as measuring or regulating instruments, to a pipe line through the intermediary of a pipe coupling incorporated in the pipe line.

More particularly, the invention contemplates provision, in the connection or junction zone between the instrument and the associated coupling, of two coaxial transfer channels disposed one within the other for conducting fluid medium to and from the instrument.

The principal object of the present invention is to provide means contributing to simplification of the double-conduit nipple of the fluid-handling instrument.

A related object of the present invention is to provide means enabling the inner transfer channel to be constituted by the inner nipple part of the pipe coupling together with the connecting nipple of the measuring instrument or metering mechanism of such an instrument, e.g., a gas or water meter, or the seat of a regulating valve, the junction between said inner nipple part and the connecting nipple being equipped with sealing means yieldable in axial direction.

According to a preferred embodiment of the invention, the inner nipples of the pipe coupling and the meter or like instrument are telescoped with respect to one another and their junction sealed by means of an interposed pressure seal. In accordance with a further characteristic of the invention, the connection between the inner nipple part of the coupling and the connecting nipple of the instrument may be effected by means of an elastic bellows without sacrifice of any of the advantages attending the first-mentioned embodiment of the invention.

The construction of the connection in accordance with the present invention is extremely valuable when considered from the standpoint of manufacturing techniques, since the meter housing nipple is now constituted only by the outer one of the two coaxially disposed nipples, the outer nipple being defined by a pipe seated on the instrument housing or casing or by a tubular extension manufactured as an integral part of such housing or casing without involving any difficulties in casting procedures.

Furthermore, the invention is possessed of another important advantage in that it eliminates one sealing location which has heretofore been required for attaining a stress-free connection especially between a gas meter and the inner part of the double-conduit nipple of a pipe coupling and which, for eliminating axial "installation stresses" and "operating stresses," had to have a certain freedom of movement or possibility of displacement. This sealing location, according to the present invention, is disposed in or about the inner nipple of the pipe coupling and brings about, apart from the aforesaid simplification of the housing nipple, attainment of a minimal size of the fluid-handling instrument.

Over and above this, the invention possesses the advantage of enabling connection of the instrument to the pipe line in a manner leaving it isolated from stresses and strains arising in the pipe line. By employing suitable means for connecting the outer nipples to one another, for example, cap nuts, threaded sleeves, two flanges one of which is loose, or the like, it becomes possible, in accordance with the invention, to attain a highly efficacious connection of the instrument to the pipe line regardless of the desired or required orientation of the instrument relative to the pipe line.

This free orientability of the fluid-handling device or instrument renders immaterial the question of whether the medium flows through the pipe line in one direction or the other, for example, from the right or from the left, as long as the pipe coupling is appropriately arranged in the pipe line. Fluid-handling instruments of similar or different constructions can thus be interchanged when connecting means according to the invention are employed.

A further simplification and an associated further minimization of the size of the instrument and thus of the entire installation can be attained by completely eliminating the double-conduit nipple of the instrument. This is brought about by inserting the outer part of the double-conduit nipple of the pipe coupling directly into a corresponding opening of the instrument houisng to which it is affixed by means of a flange provided on the outer nipple part and arranged to be engaged by screws or associated nuts, the junction between the nipple part and the housing being sealed by an inserted sealing ring or gasket. The screws or bolts and nuts could, by way of example, be replaced by tilting lever latches or like locking or clamping means.

A considerable free orientability of the instrument relative to the pipe line can also be attained in this modification of the invention by virtue of the fact that the flange of the outer nipple part is provided with at least one partly circumferentially extending slot through which the screws extend, or by virtue of the fact that the screws or associated nuts engage the outer edge of the flange and at the same time bear against an outer bearing ring supported on the sealing ring or gasket.

For thin-walled instrument housings it is additionally desirable to provide reinforcing means in the region of the opening receiving the double-conduit nipple of the pipe coupling.

These and other objects and advantages of the invention will become further apparent from the following detailed description, reference being made to the accompanying drawings showing preferred embodiments of the invention.

Figure 1:
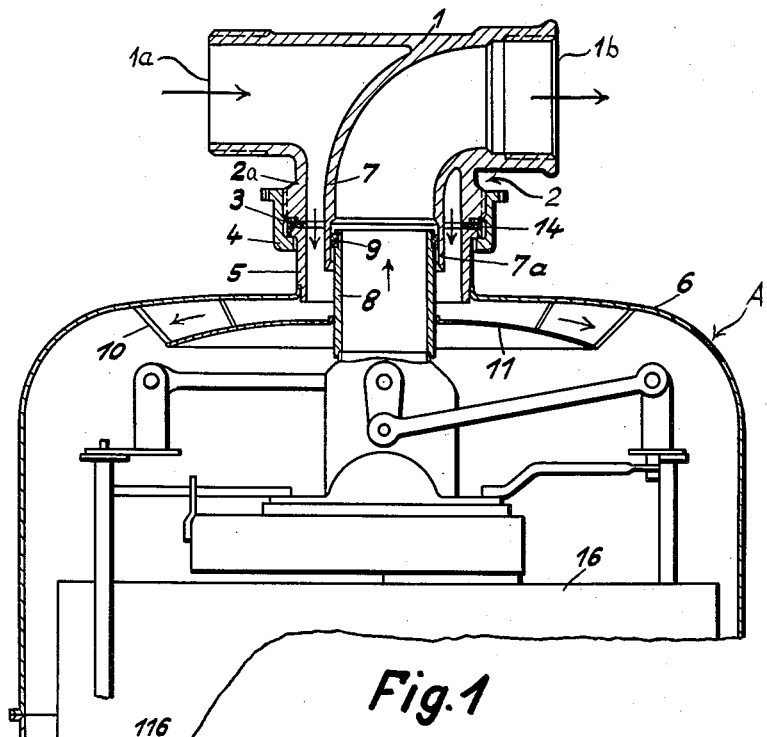
Figs. 1 to 4 show four embodiments of the instrument connection according to the present invention, each figure being a sectional view taken substantially along the longitudinal axis of the pipe coupling.

Referring now more particularly to the drawings, there is shown in Fig. 1 a pipe coupling 1 to be incorporated in a pipe line (not shown), the coupling being provided on the side thereof facing the instrument A with a double-conduit nipple generally designated by the reference numeral 2.

Figure 2:
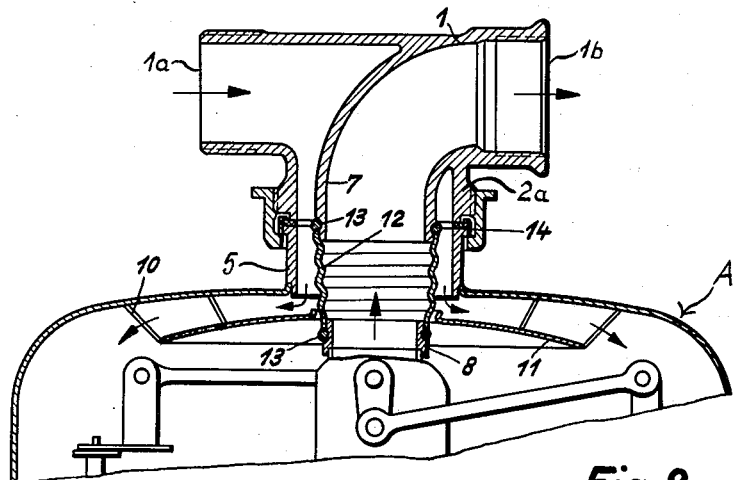

The outer nipple part 2a of the double-conduit nipple 2 is connected to and drawn against an outer nipple or outer tube 5 provided on the housing or casing 6 of the instrument A by means of a cap nut or like union element 4, a gasket or sealing ring 3 being interposed between the adjacent edges of the nipple part 2a and the nipple 5. In the embodiments of Figs. 1 and 2, the nipple 5 is soldered or welded to the housing 6.

Telescopically received in the inner nipple part 7 of the double-conduit nipple 2 of the pipe coupling 1 is a connecting nipple or inner tube 8, for example the outlet nipple, of a metering mechanism 16 (shown only schematically) disposed within the housing 6, the nipple part 7 being internally machined and widened at 7a for this purpose. The telescoped nipple elements 7 and 8, of which the nipple 8 may equally well be the outer one rather than the inner one as shown, have positioned therebetween a preferably annular pressure seal or gasket 9. As seen in Fig. 1 the pressure seal 9 is located adjacent the end of inner tube 8 where it comes into sealing engagement with the inner nipple part 7 while the outer parts are still sufficiently separated so that the installer can feel the resistance to movement of the parts offered by the pressure seal 9, thereby making sure that a dependable seal can be expected between parts 7 and 8.

As will be recognized from Fig. 1, there is provided at a predetermined distance below the upper wall of the housing 6 a deflecting plate 11 which is connected to the top of the casing or housing 6 by means of struts 10. Through this arrangement, the incoming stream of the fluid medium, which entered the coupling at 1a and is to leave the same at 1b after having flowed through the instrument A, is prevented from directly contacting the control means of the metering mechanism arranged beneath the casing top.

Referring now to Fig. 2, it will be seen that the connection between the inner nipple part 7 of the pipe coupling 1 and the connecting nipple 8 of the metering mechanism 16 may be constituted by an elastic or syphon type bellows 12, the opposite ends of which are connected in a fluid-tight manner to the adjacent ends of the nipple elements 7 and 8 by means of clamping rings 13.

In both the embodiments of Figs. 1 and 2, the ring-shaped gasket 3 disposed between the nipple part 2a and the nipple 5 is secured in position and against lateral displacement by means of a fastening ring 14, shaped preferably in the manner of an annular, centrally perforated can which closely embraces the outer top edge of the nipple 5 and is not subjected to any pressure or other stress by the various elements of the connection.

Figure 3:
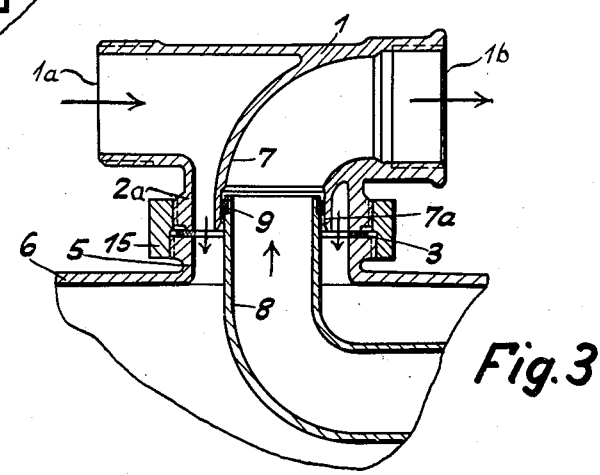

Referring now to Fig. 3, the embodiment of the invention there shown is distinguished from the embodiment of Fig. 1 by virtue of the fact that the housing nipple 5 is formed as an integral part of the housing 6. Connection of the outer nipple part 2a of the pipe coupling 1 with the housing nipple 5 is advantageously effected in this case by means of a threaded sleeve nut 15 which is provided with two axially spaced internal threads differing in pitch and inner diameter but ascending and descending in the same sense.

The nipples 2a and 5, of course, are provided with corresponding external counter-threads. By virtue of the difference in the pitches of the threads, the two nipples are drawn toward one another and pressed against the gasket 3 located therebetween through rotation of the sleeve nut 15.

It is to be noted that if the internal thread of larger diameter is disposed in the lower part of the sleeve nut, there obtains the further advantage of an additional minimizing of the height of the housing nipple 5, which consequently enables the entire instrument, for example a gas meter, to be inserted in a correspondingly smaller niche of the building wall where it is employed.

The continuity of the inner transfer channel is effected in this embodiment of the invention, as before, by disposing the connecting nipple 8 of the instrument and the nipple part 7 of the pipe coupling in telescoping relationship with respect to one another. Mowever, no matter which of the nipples 7 and 8 is the outer one, their junction is always sealed by means of a pressure gasket 9.

In this embodiment of the invention, furthermore, the inner nipple part 7 of the coupling 1 terminates in the same plane as the outer nipple part 2a. This enables such couplings to be employed with fluid-handling instruments or devices of known construction, it being only necessary that the internally widened portion 7a of the nipple part 7 is nevertheless kept thick enough to provide a sufficiently wide bearing or abutment surface.

Figure 4:
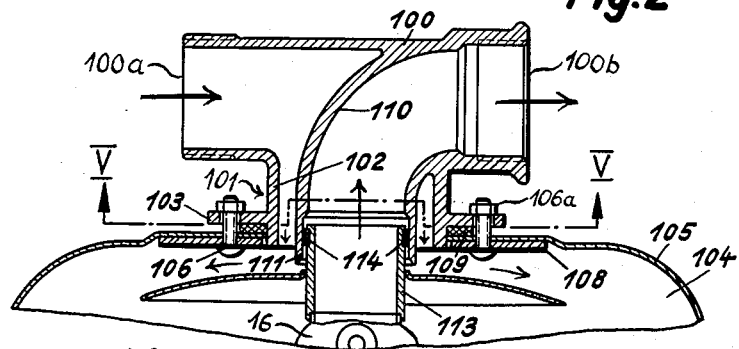
Figure 5:
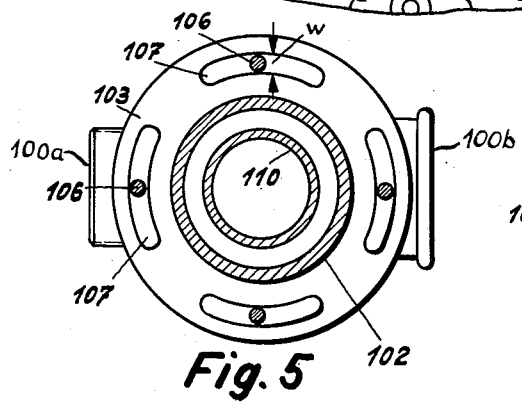
Fig. 5 is a transverse sectional view taken along the line V—V in Fig. 4.

Turning now to Figs. 4 and 5, it will be seen that the pipe coupling 100 having a fluid inlet end 100a and outlet end 100b is provided with a double-conduit nipple 101, the outer nipple part 102 of which is provided with an external annular flange 103 designed to facilitate fastening of said nipple part to the housing 105 of a fluid-handling device or instrument 104. The nipple part 102 extends into a correspondingly shaped and dimensioned circular opening provided in the top of the housing 105 and ensuring correct positioning of the nipple 101 relative to the instrument.

For fastening the instrument 104 to the pipe coupling 100, there is provided a plurality (four as seen in Fig. 5) of screws 106 fixed, as by soldering or welding, to the instrument housing or casing 105 and sealed over their entire peripheries, these screws extending through slots 107 provided in the flange 103 and coacting with nuts 106a bearing on the flange.

The slots 107, which are arranged on the circumference of a common circle centered at the axis of the double-conduit nipple 101, permit a substantially free orientation of the instrument 104 relative to the pipe line within the limits defined by the opposite ends of he slots, all of the latter, of course, having substantially the same length. The width w of each slot 107 must be so predetermined, as seen in Fig. 5, that the screws 106 or tilting lever-type locking means or latches (if these are employed) can pass without being hindered or stressed through the slots.

The housing 105, should its walls be constructed of relatively thin sheet metal or like material, is reinforced in the region of the opening into which the outer nipple part 102 of the pipe coupling 100 is inserted by means of a reinforcing plate or layer 108 which is fixed, as by soldering or welding to the top of the housing and sealed over its entire circumference.

A gasket 109 interposed between the flange 103 and the casing 105 prevents flow or escape into the surrounding atmosphere of any fluid medium which has not yet passed through the instrument. The inner nipple part 110 of the pipe coupling extends somewhat deeper into the instrument housing than the outer nipple part 102 and receives in its foremost part 111, which may also be internally widened, the vertically upwardly extending outlet nipple 113 of the metering mechanism 16.

In this event, however, provision must be made for adjustment or displacement of the nipple 113 axially within the part 111 of the inner nipple 110. The junction between the nipples 113 and 110 is sealed by means of a pressure gasket 114.

The metering mechanism 16, which may be considered as being the same in all of the embodiments of the invention, is supported on the bottom of the housing 6 or 105 at two locations 116 (see Fig. 1), and its outlet nipple 8 or 113 extends into the inner nipple part 7 or 110 of the pipe coupling. Through this arrangement, a stress-free mounting of the metering mechanism in the housing and a stress-free connection of the entire meter or instrument to the pipe coupling are attained.

Figure 6:
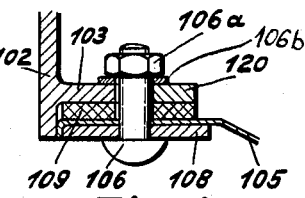
Fig. 6 is a partly sectional view of a modified form of the connection and sealing joint between the pipe coupling and the instrument housing.

In order further to bring about a completely free orientability of the instrument 104 relative to the pipe line and coupling 100, the connection of the instrument to the pipe coupling as shown in Figs. 4 and 5 can be modified and effected as shown in Fig. 6. According to this modification, the screws 106 extend past and out of contact with the outer edge of the flange 103 provided on the outer nipple part 102, whereby the slots 107 provided in the embodiment of Figs. 4 and 5 are dispensed with.

In a construction as in Fig. 6, however, it is desirable to provide a special bearing ring 120 around the screws 106, so that the nuts 106a associated with these screws bear at one side on the flange 103 and at the other side on the bearing ring 120 through the intermediary of suitable washers 106b.

The gasket 109 is preferably so dimensioned that it extends also beneath the bearing ring 120 which must in this case have the same thickness as the flange 103. Alternatively, two concentric but separate gaskets or rings 109 may be employed.

From the foregoing it will be seen that the present invention provides means for connecting to a pipe line a fluid-handling device having a housing (6 or 105) a first portion (5 or the housing cover and its opening) of which defines an outer inlet duct and a second portion (8 or 113) of which defines an inner outlet duct concentric with said inlet duct. The connection means comprises a pipe coupling (1 or 100) adapted to be connected at respective spaced inlet and outlet ends (1a and 1b or 100a and 100b) with said pipe line and provided with a double-conduit nipple (2 or 101) disposed intermediate said ends, said double-conduit nipple being provided with outer and inner nipple parts (2a and 7 or 102 and 110) defining coaxial outer and inner conduits communicating with said inlet and outlet ends, respectively. Fastening means (4, 15 or 106—106a) are operatively connected with the outer nipple part of the double-conduit nipple and with the first portion of the housing and draw the same toward and against one another, and means (9, 12 or 114) are provided for yieldably interconnecting the second portion of the housing with the inner nipple part of the double-conduit nipple in a fluid-tight manner.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A coupler for fluid-tight connection of a fluid handling device having a double conduit fitting comprised of inner and outer tubes defining inflow and outflow passages, comprising a pipe coupling provided with a double-conduit nipple, said double-conduit nipple being provided with outer and inner nipple parts defining outer and inner conduits, fastening means connected with said outer nipple part of said double-conduit nipple and with the outer tube of the double-conduit fitting and drawing the same toward and against one another substantially without relative rotation of the parts being drawn together, said inner nipple part of said double conduit nipple and said inner tube being telescopically arranged with respect to one another, and a pressure seal interposed between said telescoping connecting nipple and said inner nipple part and being affixed to one of the telescoping end portions of said connecting nipple and said inner nipple part at a sufficiently forward position thereon to come into sealing engagement with the other of said telescoping end portions before the outer tube of the double conduit fitting and the outer nipple part are brought together, whereby the tightness of the telescoping seal thus provided may be felt, and whereby after feeling the tightness of said seal, said outer nipple part may then be brought to sealed condition with said outer tube of said double conduit fitting of said fluid handling device by said fastening means.

2. Means for connecting a fluid handling device to a pipe line comprising a coupler according to claim 1 including an extension of the outer tube forming a portion of the housing for the fluid handling device, a deflecting plate engaging the inner tube within the outer tube and supporting the inner tube within the outer tube, and supports secured to said portion of the housing and suspending the deflecting plate therefrom and extending in spaced relation thereto.

References Cited in the file of this patent

UNITED STATES PATENTS

| | | |
|---|---|---|
| 783,987 | Walsh | Feb. 28, 1905 |
| 1,160,703 | Fleming | Nov. 16, 1915 |
| 1,674,561 | Mueller | June 19, 1928 |
| 2,063,233 | Debuch | Dec. 8, 1936 |
| 2,196,766 | Hasche | Apr. 9, 1940 |
| 2,565,744 | Sinclair | Aug. 28, 1951 |
| 2,799,166 | Rings | July 16, 1957 |
| 2,850,264 | Grable | Sept. 2, 1958 |
| 2,881,012 | Rings | Apr. 7, 1959 |

FOREIGN PATENTS

| | | |
|---|---|---|
| 522,165 | Belgium | Feb. 17, 1954 |